US009715620B2

(12) United States Patent
Lysenkov et al.

(10) Patent No.: US 9,715,620 B2
(45) Date of Patent: Jul. 25, 2017

(54) METHOD TO POSITION A PARALLELEPIPED BOUNDED SCANNING VOLUME AROUND A PERSON

(71) Applicants: Ilya Lysenkov, Nizhny Novgorod (RU); Aleksandr Shishkov, Nizhny Novgorod (RU)

(72) Inventors: Ilya Lysenkov, Nizhny Novgorod (RU); Aleksandr Shishkov, Nizhny Novgorod (RU)

(73) Assignee: Itseez 3D, Inc., San Jose, CA (US)

( * ) Notice: Subject to any disclaimer, the term of this patent is extended or adjusted under 35 U.S.C. 154(b) by 0 days.

(21) Appl. No.: 15/154,449

(22) Filed: May 13, 2016

(65) Prior Publication Data

US 2016/0335783 A1 Nov. 17, 2016

Related U.S. Application Data

(60) Provisional application No. 62/162,488, filed on May 15, 2015.

(51) Int. Cl.
| | |
|---|---|
| *G06K 9/00* | (2006.01) |
| *G06T 19/00* | (2011.01) |
| *G06T 7/66* | (2017.01) |
| *H04N 13/02* | (2006.01) |

(52) U.S. Cl.
CPC ............ *G06K 9/00255* (2013.01); *G06T 7/66* (2017.01); *G06T 19/00* (2013.01); *G06T 2210/12* (2013.01); *H04N 13/0271* (2013.01)

(58) Field of Classification Search
CPC ..... G06K 2009/00328; G06K 9/00221; G06K 9/00248; G06K 9/00255; G06K 9/00295; G06K 9/033; G06T 2210/12; G06T 7/66; H04N 13/0271; H04N 13/025
See application file for complete search history.

(56) References Cited

U.S. PATENT DOCUMENTS

| | | | | |
|---|---|---|---|---|
| 6,611,613 | B1* | 8/2003 | Kang | G06K 9/00228 382/118 |
| 2007/0239409 | A1* | 10/2007 | Alan | G06F 17/5009 703/2 |
| 2010/0034457 | A1* | 2/2010 | Berliner | G06K 9/00362 382/154 |
| 2011/0019003 | A1* | 1/2011 | Asa | G06K 9/00221 348/159 |
| 2012/0095589 | A1* | 4/2012 | Vapnik | G06Q 30/06 700/132 |
| 2013/0173226 | A1* | 7/2013 | Reed | G06K 9/62 703/1 |
| 2014/0160123 | A1* | 6/2014 | Yang | G06T 17/00 345/420 |
| 2014/0254867 | A1* | 9/2014 | Hoof | G06K 9/4604 382/103 |
| 2016/0327394 | A1* | 11/2016 | Al-Rawashdeh | G01M 1/127 |

OTHER PUBLICATIONS

Hiromasa et al. "Cubistic Representation for Real-time 3D shape and Pose Estimation of Unknown Rigid Object" 2013, IEEE International Conference on Computer Vision Workshops. pp. 522-529.*

* cited by examiner

*Primary Examiner* — Jingge Wu
(74) *Attorney, Agent, or Firm* — VLP Law Group LLP; Kent H. Cheng

(57) ABSTRACT

The present invention provides an efficient three dimensional scanning of a person.

2 Claims, 2 Drawing Sheets

METHOD TO POSITION A PARALLELEPIPED BOUNDED SCANNING VOLUME AROUND A PERSON

CROSS REFERENCE TO RELATED APPLICATIONS

This application claims the benefit of U.S. Provisional Application No. 62/162,488, filed May 15, 2015, the entire content of which is incorporated by reference.

BACKGROUND OF THE INVENTION

Field of Invention

The present invention relates to an efficient three dimensional scanning of a person with reduced computation time, memory requirements, disc storage and network bandwidth usage requirements.

SUMMARY OF THE INVENTION

One of the important problems of 3D scanning is selecting a 3-dimensional bounding box around an object to be scanned. This invention describes a solution to this problem for scanning people. The algorithm described herein aims to place a cube or a parallelepiped bounded scanning volume around a person automatically using a face detection method and IMU sensors. The core of the algorithm is using face detection to find a head in 3D space and accelerometer data to align the parallelepiped along a person. This method makes the scanning process intuitive for a user, as opposed to a user adjusting the cube size and position himself.

We have been working on the problem of people 3D scanning using a mobile device (tablet) with a depth sensor. One of the first steps of the algorithm is choosing a bounded space that we will scan. It can help to avoid noise when people move around the scanning subject. Also it is useful to separate the scanning person from the environment. So the goal of this research was to develop a placement algorithm for automatically selecting a parallelepiped around a person. It should cover the whole person as tightly as possible.

In imaging a person, segmentation researchers have used a face detector and some clustering method (e.g. [1]). But in our present method we don't need to segment a person in an image. The present method chooses a parallelepiped that will limit scanning volume. Also it allows much faster processing than the prior art, because there is no need to run a computationally expensive background-foreground subtraction or clustering method. Also, the novelty is the alignment along a human body. Likewise, we fix parallelepiped size and the user does not need to change it in the scanning process, which is crucial for user experience. A user should just place a device so that a person's face is visible and the system automatically limits the scanning volume.

BRIEF DESCRIPTION OF DRAWINGS

FIG. 1 shows the results of the placement method for bust scanning.

FIG. 2 shoes the results of the placement method for full body scanning.

DESCRIPTION OF EMBODIMENTS

Figure 1:
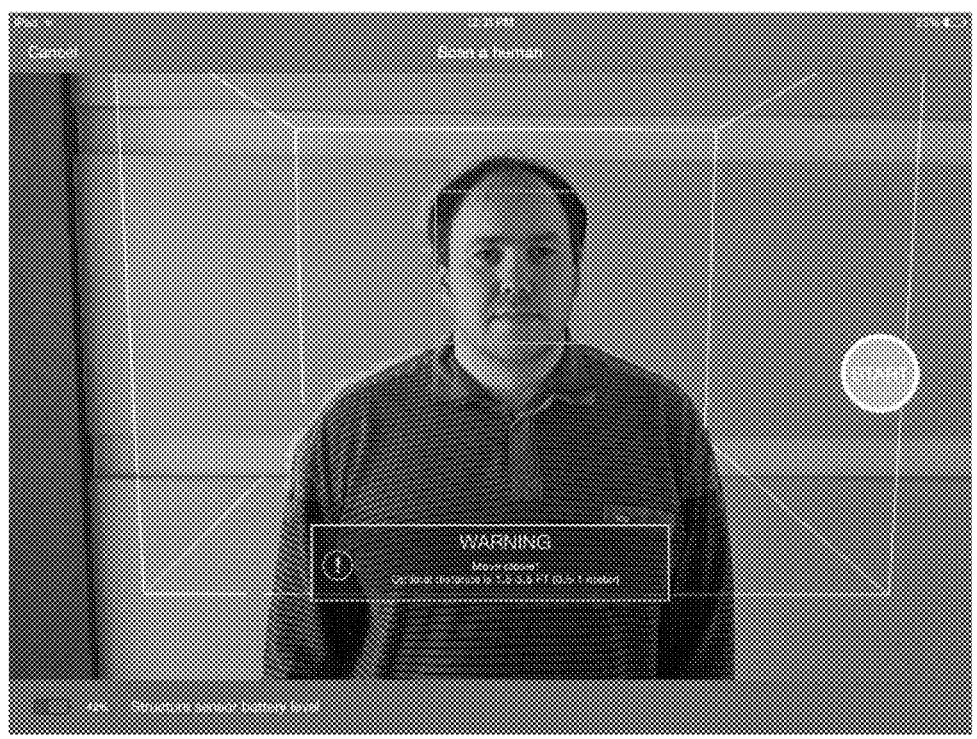
FIGS. 1 and 2 illustrate results of the placement method in the cases of bust scanning and full body scanning correspondingly.
Figure 2:

We are using a sequence of RGBD frames (RGB images and depth images taken at the same moments of time) as input data. An RGB image contains intensity values of red, green and blue color channels for each pixel. A depth image contains distance from the sensor to a 3D object for each of the pixels. A depth sensor may not calculate distance to an object for a number of reasons (for example, a structured light depth sensor will fail if an object is too close or its surface is too reflective), and then the corresponding pixels in the depth image will contain special, "non-valid" values. In contrast, pixels with known depth are called "valid".

The algorithm comprises finding a face in an RGB image, then finding the 3D points corresponding to a face, and, finally, building a parallelepiped. In more detail, for each frame the algorithm consists of the following steps:

1. Detect a face on an RGB image with any face detection method (such as [4]). The output of this operation is a rectangle in the image that contains the face. If the face detector returns several rectangles with faces we choose one with the minimum distance between the center of the face rectangle and the center of the image.

2. Find pixels in the depth image corresponding to the face rectangle in the RGB image using extrinsic parameters (relative poses of rgb and depth cameras) that are known in advance.

3. If the ratio of pixels in the RGB image corresponding to valid depth values in the depth image to the total number of pixels in this region is less than a fixed threshold (we use the value of 0.2), we stop this procedure. It helps to avoid some failures. For example if a person stands too close to a depth sensor, depth values for face pixels are not valid. So we can process only few depth values from background that are located in the face rectangle.

4. Calculate a median for depth values corresponding to face pixels.

5. Project the center of the rectangle returned by the face detector from an RGB image to a depth image and calculate the corresponding 3D point. Substitute Z coordinate value of this point by median depth value from the previous step. This is the point P corresponding to the center of the face surface that the sensor perceives.

6. Given the point P from the previous step, we want to compute the coordinates of the center of a head—we will use it to set the parallelepiped. In order to do it we find a normal to a horizontal plane by using the gravity sensor in a mobile device. Then we calculate a vector V in a horizontal plane directed from the sensor to the point P. We calculate a position that is offset to a fixed distance (we use 10 cm, as the variation of human head sizes is not very large) from the point P along the vector V. We will refer to the resulting point A as the anchor point.

7. Create the parallelepiped with enough size. We are using two different scanning modes: bust and full-body. We choose a small parallelepiped (0.7 m×0.52 m ×0.7 m) for bust scanning. If it is portrait we create bigger parallelepiped (e.g. 2 m×3 m×2 m) to cover the whole person.

8. Place a parallelepiped in such a way that the anchor point A is in the center of the upper third of it in the case of full body scanning. We place this point in the center of the parallelepiped for the bust mode.

9. Rotate a parallelepiped so that one of its axes (the longest for the case of full body mode) is aligned with the gravity vector. We assume that a person stands on a floor and the gravity vector is perpendicular to the ground plane.

REFERENCES

[1] Macedo M. C., Apolinario Jr A. L. and Souza A. C. KinectFusion for Faces: Real-Time 3D Face Tracking and Modeling Using a Kinect Camera for a Markerless AR System. SBC, 4(2), 2013.

[2] Macedo M. C., Apolinario Jr A. L. and Souza A. C. A Markerless Augmented Reality Approach Based on Real-Time 3D Reconstruction using Kinect. Workshop of Works in Progress (WIP) in SIBGRAPI, 2013.

[3] Hiromasa Yoshimoto and Yuichi Nakamura. 2013. Cubistic Representation for Real-Time 3D Shape and Pose Estimation of Unknown Rigid Object. In Proceedings of the 2013 IEEE International Conference on Computer Vision Workshops (ICCVW'13). IEEE Computer Society, Washington, D.C., USA, 522-529.

[4] Paul A. Viola, Michael J. Jones. Robust Real-Time Face Detection. International Journal of Computer Vision 57(2): 137-154 (2004).memory streaming environments. In Advances in Visual Computing (pp. 359-370). Springer Berlin Heidelberg.

The invention claimed is:

1. A method for 3D scanning of a person's head using a RGB image sensor, a depth sensor and a gravity sensor comprising:
   a) detecting a face on an RGB image comprising pixels and producing a face rectangle in the RGB image that contains the face of the person;
   b) detecting the distance from the depth sensor to the face for a plurality of the pixels within the face rectangle to produce a depth image;
   c) determining the center of the face using the RGB image and the depth image;
   c) determining a gravity vector using the gravity sensor;
   d) computing the coordinates of the center of the head of the person using the center of the face and the gravity vector;
   e) creating a parallelepiped with enough size to cover the head of the person wherein the center of the parallelepiped is the center of the head of the person; and
   f) rotating the parallelepiped around an axis aligned with the gravity vector to create a 3-dimensional bounding box.

2. A method for 3D scanning of a person's body using a RGB image sensor, a depth sensor and a gravity sensor comprising:
   a) detecting a face on an RGB image comprising pixels and producing a face rectangle in the RGB image that contains the face of the person;
   b) detecting the distance from the depth sensor to the face for a plurality of the pixels within the face rectangle to produce a depth image;
   c) determining the center of the face using the RGB image and the depth image;
   c) determining a gravity vector using the gravity sensor;
   d) computing the coordinates of the center of the head of the person using the center of the face and the gravity vector;
   e) create a parallelepiped with enough size to cover the body of the person wherein the center of the head of the person is in the upper third of the parallelepiped;
   f) rotate the parallelepiped around an axis aligned with the gravity vector to create a 3-dimensional bounding box.

* * * * *